Figure 1:
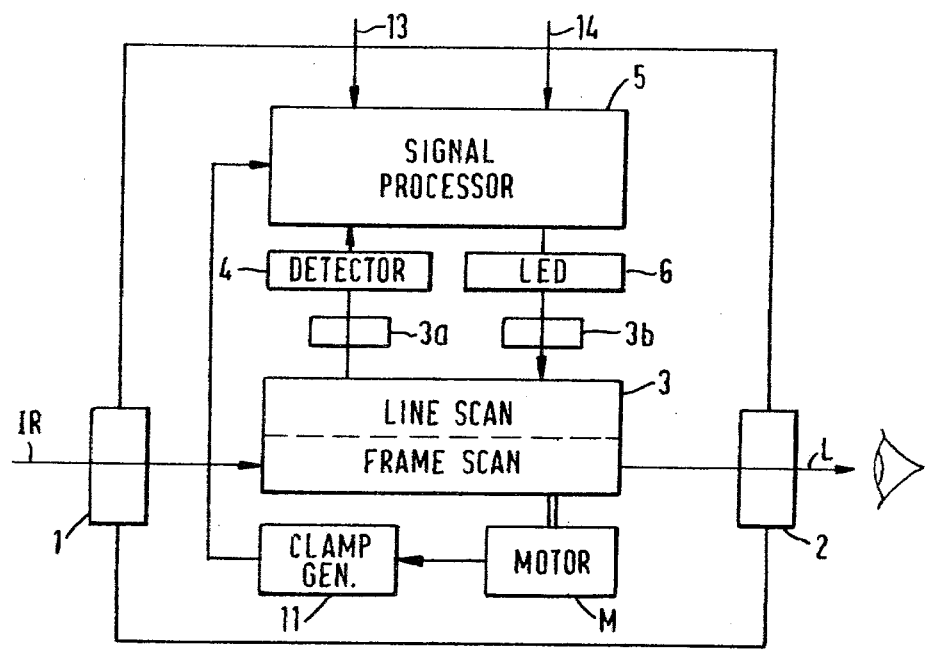

United States Patent [19]

Hurst

[11] 4,255,658
[45] Mar. 10, 1981

[54] IMAGE FORMING APPARATUS

[75] Inventor: Ivan R. Hurst, Frimley, England

[73] Assignee: EMI Limited, Hayes, England

[21] Appl. No.: 9,355

[22] Filed: Feb. 5, 1979

[30] Foreign Application Priority Data

Feb. 14, 1978 [GB] United Kingdom ................ 5792/78

[51] Int. Cl.³ .............................................. H01J 31/49
[52] U.S. Cl. ..................................... 250/332; 250/334
[58] Field of Search ........................ 250/330, 332, 334

[56] References Cited

U.S. PATENT DOCUMENTS

| 3,685,048 | 8/1972 | Pincus . |  |
|---|---|---|---|
| 3,742,238 | 6/1973 | Hoffman | 250/332 |
| 3,786,269 | 1/1974 | Cooper | 250/332 |
| 3,812,357 | 5/1974 | Flogaus et al. | 250/332 |
| 3,949,225 | 4/1976 | Aguilera | 250/332 |

FOREIGN PATENT DOCUMENTS

| 935242 | 8/1963 | United Kingdom . |
| 1232857 | 5/1971 | United Kingdom . |
| 1285606 | 8/1972 | United Kingdom . |
| 1352889 | 5/1974 | United Kingdom . |
| 1368360 | 9/1974 | United Kingdom . |
| 1431056 | 4/1976 | United Kingdom . |
| 1455792 | 11/1976 | United Kingdom . |
| 1478761 | 7/1977 | United Kingdom . |

OTHER PUBLICATIONS

Higham et al, Thermal Imager Using Ceramic Pyroelectric Detectors, *International Conference on Low Light and Thermal Imaging Systems*, Institution of Electrical Engineers, London, Mar. 3–5, 1975, pp. 207–211.

*Primary Examiner*—Davis L. Willis
*Attorney, Agent, or Firm*—Fleit & Jacobson

[57] ABSTRACT

The imager comprises an array 4 of detectors, and an array 6 of LEDs each detector being connected to a corresponding LED by a respective signal processing channel 5a. Common to all the channels is a ramp generator 12. Each channel has a comparator 9 which compares the ramp with the signal from its detector to produce a pulse width modulated signal for its LED. Thus the LED is always driven at the same point on its characteristic, variation of brightness being achieved by variation of pulse width. Use of a common ramp generator makes for simple change of ramp shape, temperature window, offset and γ law by simply changing only the ramp generator.

7 Claims, 9 Drawing Figures

IMAGE FORMING APPARATUS

The present invention relates to an image forming apparatus.

According to the present invention, there is provided an image forming apparatus including a plurality of detectors responsive to radiation from a scene to produce respective electrical signals; a plurality of light emissive devices; a plurality of channels coupling the detectors to the light emissive devices, each channel including a comparator arranged to compare a repetitive sampling signal, having a waveform in the form of a ramp, with the electrical signal produced by its associated detector to produce for its associated light emissive device electrical pulses of widths determined by the electrical signal and the repetitive sampling signal, the emissive devices being responsive to the electrical pulses to produce corresponding light pulses; a generator common to all the channels for repetitively producing the sampling signal; and scanning means arranged to cause the electrical signals to represent portions of the object according to a predetermined scanning pattern and to cause the light pulses to form an image of the scene according to that pattern.

In an embodiment of the invention, the detector arrangement is responsive to thermal, i.e. infra-red, radiation. Preferably, the light emissive devices comprise light emitting diodes.

Figure 2:
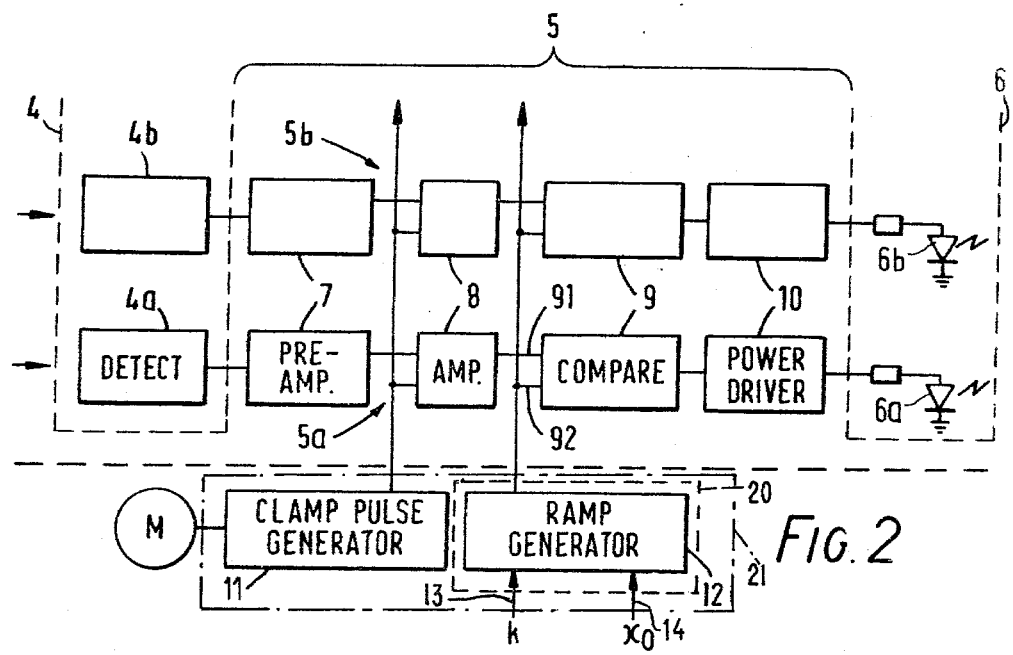
Figure 5:
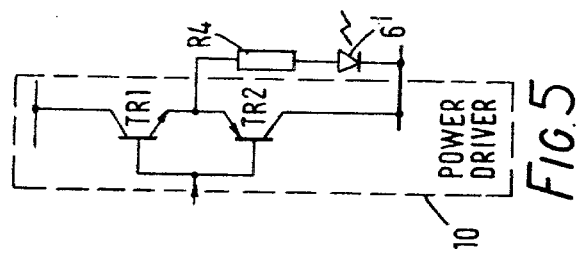
Figure 4:
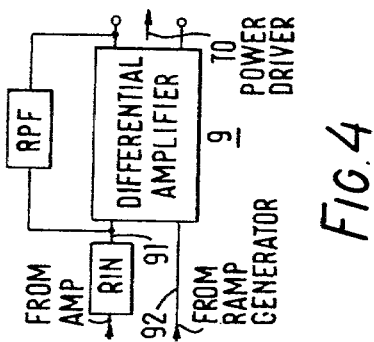
Figure 3:
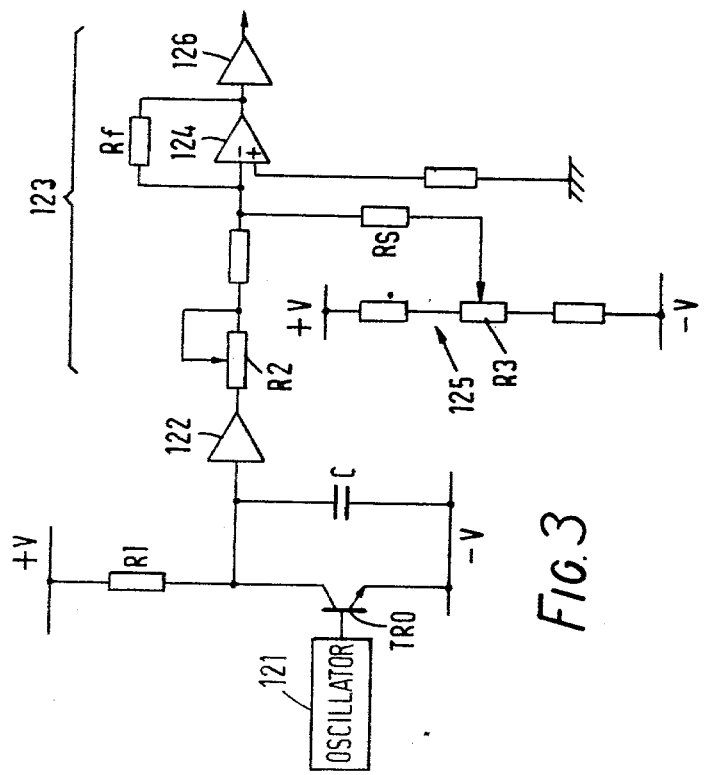

For a better understanding of the present invention, reference will now be made, by way of example, to the accompanying drawings, in which:

FIG. 1 is a schematic diagram of an image forming apparatus according to the present invention, FIG. 2 is a block circuit diagram of a signal processor of the apparatus of FIG. 1, FIG. 3 is a circuit diagram of a ramp generator which may be used in the processor of FIG. 2, FIG. 4 is a block diagram of a comparator, FIG. 5 is a circuit diagram of a power driver, and FIGS. 6a to 6d are diagrams explaining the operation of the signal processor The exemplary image forming apparatus of FIG. 1 is a direct view imager which receives thermal, i.e. infra-red, radiation IR through a suitable optical arrangement 1 and produces visible light L emitted through another optical arrangement 2. The optical arrangement 1 forms a first, infra-red, image of the scene viewed by the imager and this image is scanned by a scanner 3 driven by a motor M. The scanner 3 comprises a frame scan device and a line scan device which scan the first image according to a predetermined scanning pattern, and infra-red radiation representing successive portions of the first image is thereby applied to a detector arrangement 4 via a lens 3a. The detector arrangement 4 responds to the infra-red radiation to produce electrical signals representing the successive portions or "pixels" of the first image. These signals are processed in a manner to be described hereinafter in a signal processor 5 and applied to a light-emissive means 6 comprising light-emitting diodes (L.E.D.s). Light emitted by the diodes is applied to the scanner 3 via a lens 3b whereby a second image, in light, is formed according to the predetermined scanning pattern. This pattern is viewed via the optical arrangement 2.

According to the present invention, the signal processor 5 is responsive to the electrical signals produced by the detector arrangement 4 to produce electrical pulses of widths predetermined by those signals to give tonal gradation, which pulses are applied to the light emissive means 6. This is advantageous with light sources, particularly LEDs, in which there is the difficulty that neither the voltage/current relationship nor the current/light output relationship is linear. Thus any attempt to amplitude modulate the LEDs to give tonal gradation is difficult. Furthermore, in an embodiment, such as is shown in FIG. 2, where there are an array of detectors and an array of LEDs linked by a plurality of channels, further difficulties are caused by variations of the current/voltage and current/light relationships from diode to diode. These difficulties are at least reduced by energising the LEDs with pulses of variable width to give tonal gradation.

Referring to FIG. 2, the detector arrangement 4 comprises an array of detectors 4a. 4b . . . and the light emissive means 6 comprises an array of LEDs 6a, 6b . . . Each diode 6a, 6b is connected to a corresponding detector 4a, 4b via a signal processing channel 5a, 5b. Each channel comprises a preamplifier 7, an intermediate amplifier 8, a comparator 9 and a power driver 10. Common to all the channels are a clamp pulse generator 11 and a ramp generator 12.

The clamp pulse generator provides the clamp pulses to all the intermediate amplifiers in synchronism with the scanning which is controlled by the motor M for this purpose. The purpose of the clamp pulses is to periodically reset the level of the D.C. bias of the intermediate amplifiers. The periodic resetting of the D.C. bias is essential, in practice, to the comparator technique described hereinbelow. Without it the mean D.C. levels in the intermediate amplifiers would change with input signal mean levels. The clamping keeps the mean D.C. levels of the channels constant.

The ramp generator provides a sawtooth sampling waveform to all the comparators. The frequency f, of repetition of the waveform is at least twice that of the rate of production of the electrical signals representing the image portions of "pixels" to satisfy normal sampling criteria, i.e. f=2/pixel time. The sawtooth may have various shapes as will be described hereinafter. Each comparator 9 receives the amplified signal produced by its associated detector 4a, 4b . . . at an input 91 and the sampling waveform at an input 92 and compares the instantaneous magnitudes of the signal with those of the waveform to produce an output pulse of width dependent on the instantaneous comparison level but of constant magnitude. These pulses are amplified in the associated power drivers 10 and applied to the associated LED 6a or 6b . . . Thus the LEDs are always energised at the same points on their voltage/current and current/light characteristics, but for varying periods of time, whereby the apparent brightness of the light produced by them is varied.

Figure 6:
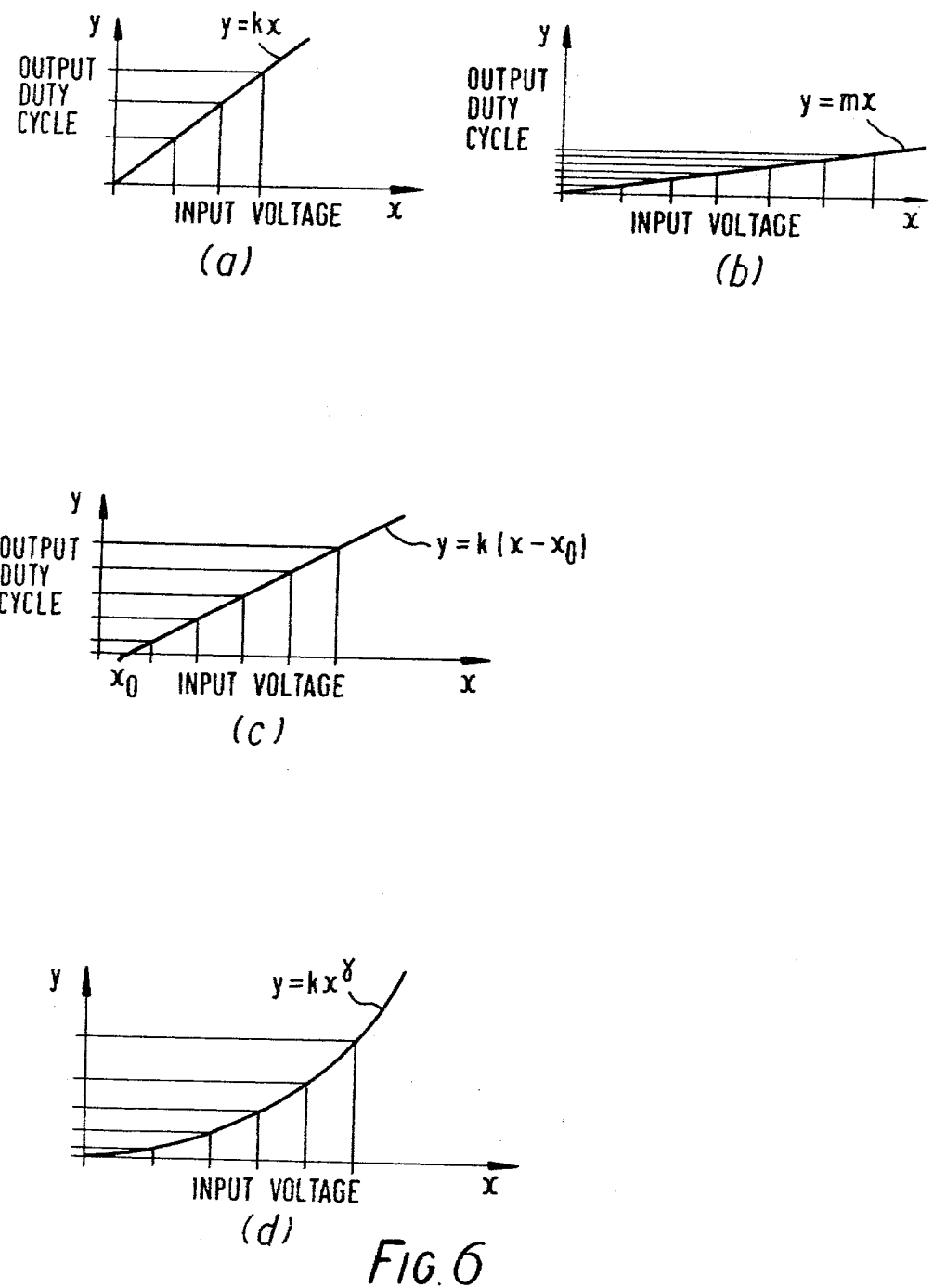

The sawtooth may have various shapes as was mentioned hereinbefore. Referring to FIG. 6, the sawtooth may have a linear active ramp portion as shown in FIG. 6(a), and a retrace portion (not shown) producing pulses at the output of a comparator 9 having a duty cycle y directly proportional to the voltage x of the signal produced by the detector 4a, 4b associated with that comparator. x varies with the temperature of the object being viewed. The constant of proportionality, i.e. the slope k between x and y defines the range (known as temperature window) of temperatures represented in the second image. This is because the larger the value of k, the smaller the range of x required to vary y from its minimum value 0% to its maximum value 100%. In other words, slope k defines the contrast of the second image. Referring to FIG. 6(b), the constant of proportionality between x and y has a value m which defines a larger range of duty cycle and thus a larger temperature window and smaller contrast.

An offset xo as indicated in FIG. 6(c) can be introduced, thereby to set a predetermined minimum value of x. The offset xo sets the level of the output of the detectors 4a, 4b in response to which no output is produced by the LEDs; in other words, it sets the "black level" for the second image.

The sawtooth may be of exponential form, as shown in FIG. 6d, $y = kx^\gamma$. Although not illustrated, k may be may be changed so that, for example, $y = mx^\gamma$ and/or an offset xo may be introduced so that $y = k(x - xo)$ for example. Furthermore $\gamma$ itself may be changed. Moreover, the relationship between y and x may take the form of a more complex $\gamma$ law which is non-continuous.

In the circuit shown in FIGS. 1 or 2, provision is made for varying the slope constant k or m by means schematically denoted at 13 and for varying the offset xo by means schematically denoted at 14.

In order to change the form of the active ramp portion of the sawtooth, e.g. from linear to exponential form, it is necessary to replace the entire ramp generator 12. However, the ramp generator is common to all the channels 5a, 5b so making the change simple. Advantageously, the generator 12 is mounted on its own individual circuit board 20 (shown in dashed lines in FIG. 2) or at least mounted on a circuit board 21 (shown in dash-dot lines in FIG. 2) with other circuits common to all the channels such as the clamp pulse generator.

An example of the ramp generator 12 is shown in FIG. 3. The generator produces a ramp of exponential form e.g. $y = x^\gamma$ An oscillator 121 defines the frequency of repetition of the sawtooth waveform produced by the generator, i.e. the sampling frequency. The oscillator switches a transistor TRO on and off. When the transistor is off, a capacitor C charges exponentially via a resistor R1 and when the transistor is on, the capacitor C discharges through the collector emitter path of the transistor. Thus the sawtooth waveform produced by this has an exponential active ramp portion. A buffer amplifier 122 applies the sawtooth waveform to a combining circuit 123 comprising a variable resistor R2, an operational amplifier 124 having a feedback resistor Rf connecting its input and output, and a potential divider 125 comprising a variable resistor R3 and associated series resistor Rs connected to the input. Another buffer amplifier 126 may be connected to the output of the amplifier 124.

Resistors R2 and Rf together define the gain of the amplifier 124, and by varying R2 the gain is varied and thus the amplitude of the sawtooth is varied. The amplitude of the sawtooth must be equal to or greater than the amplitude of the input signals with which it will be compared. Thus the greater the temperature window (and range of input signals) the greater the amplitude of the ramp. If the input of the amplifier is of the form $y = x^\gamma$, the output of the amplifier 124 is of the form $y = ax^\gamma$ where a is proportional to the inverse of the slope constant k or m, and is the gain of the amplifier set by R2; variation of a varies the amplitude of the sawtooth and thus the temperature window. Thus R2 constitutes the means 13 of FIGS. 1 or 2.

The potential divider 125 applies a d.c. bias defining the offset to the input of the amplifier. The magnitude of the offset is set by R3 and Rs which thus constitutes the means 14 of FIGS. 1 or 2.

The circuit of FIG. 3 constitutes means of producing a ramp of preset form, e.g. exponential form, and of varying the slope of the ramp and of varying the offset, by variation of ramp amplitude and d.c. level.

In order to vary the form of the ramp, the circuit, or at least the ramp generating portion of it, would have to be replaced by a different circuit.

FIG. 4 shows an example of the comparator 9 which, in practice, must have high speed capabilities and high common mode regjection ratio differential input. This comparator is formed of a very high gain differential amplifier (rather than a comparator perse) provided with positive feedback by a resistor RPF to give a Schmitt action to ensure clean switching to produce the pulses. The amplifier has an input 92 for receiving the sawtooth produced by the ramp generator 12 and an input 91 for receiving an input signal from its associated detector 4 via a resistor R1N. R1N and RPF control the change of the input signal for which there is no change in output pulse width, and thus the mean resolvable temperature difference for any given preceding channel gain and ramp amplitude.

An advantageous consequence of the above described comparison technique is that, outside the temperature window, the duty cycle limits cleanly at the 0% and 100% brightness levels.

FIG. 5 shows an example of the power driver 10 built using discrete components. An LED represents a highly capacitive load, and hence needs to be driven from a low impedance source, and this impedance must be kept low on both positive and negative going edges of the pulses produced by the comparator 9. Also an LED is best driven with current, because an LED has a non linear characteristic of voltage against current, and because it would be very easy to exceed the maximum current rating of the LED if it were driven by a voltage. The power driver 10 shown in FIG. 5 provides the required low impedance source. It comprises complementary emitter followers TR1, TR2 in series with a resistor R4. The power driver could be implemented in thick film form. If this is done, a more elegant circuit, similar to the output stage of a TTL logic gate, can be used instead of the shown circuit.

Various modifications to the above described image forming apparatus are possible. For instance, instead of using a fixed detector arrangement 4 and light emitter diode array 6, and using a scanner 3, the detector arrangement 4 and array 6 could be moved to perform scanning. Furthermore, although the apparatus shown in the drawing comprises two channels 5, it could comprise only one channel 5 or three or more channels.

What I claim is:

1. An image forming apparatus including a plurality of detectors responsive to thermal radiation from a scene to produce respective electrical signals; a plurality of light emissive diode devices; a plurality of channels coupling the detectors to the light emissive diode devices, each channel including a comparator arranged to compare a repetitive sampling signal, having a waveform in the form of a ramp, with the electrical signal produced by its associated detector to produce for its associated light emissive diode device electrical pulses of widths determined by the electrical signal and the sampling signal, the emissive devices being responsive to the electrical pulses to provide corresponding light pulses; a generator common to all the channels for producing the sampling signal, the generator including means for varying the slope of the ramp and means for applying an adjustable d.c. bias to the ramp whereby contrast and offset are variable; and scanning means arranged to cause the electrical signals to represent portions of the object according to a predetermined scanning pattern and to cause the light pulses to form an image of the scene according to that pattern.

2. Apparatus according to claim 1, wherein the comparator of each channel comprises a differential amplifier provided with positive feedback to give a Schmitt action.

3. Apparatus according to claim 1, wherein the sampling signal generator is mounted on a circuit board alone, and all other circuits are mounted on at least one other circuit board.

4. Apparatus according to claim 1, wherein a clamp pulse generaor common to all the channels and the sampling signal generator are mounted on the same circuit board, all other circuits being mounted on at least one other circuit board.

5. Apparatus according to claim 1, wherein said ramp has a linear form.

6. Apparatus according to claim 1, wherein said ramp has an exponential form.

7. Apparatus according to claim 1, comprising a clamping pulse generator common to all the channels and wherein the channels comprise respective means for setting the D.C. levels of the channels in response to the clamping pulse generator.

* * * * *